United States Patent
Begon et al.

(10) Patent No.: US 7,590,826 B2
(45) Date of Patent: Sep. 15, 2009

(54) SPECULATIVE DATA VALUE USAGE

(75) Inventors: Florent Begon, Antibes (FR); Philippe Jean-Pierre Raphalen, Valbonne (FR); Norbert Bernard Eugene Lataille, Le Cannet (FR); Frederic Claude Marie Piry, Cagnes-sur-Mer (FR)

(73) Assignee: ARM Limited, Cambridge (GB)

( * ) Notice: Subject to any disclaimer, the term of this patent is extended or adjusted under 35 U.S.C. 154(b) by 312 days.

(21) Appl. No.: 11/593,151

(22) Filed: Nov. 6, 2006

(65) Prior Publication Data

US 2008/0109614 A1    May 8, 2008

(51) Int. Cl.
    G06F 15/76    (2006.01)
(52) U.S. Cl. ...................................... 712/216
(58) Field of Classification Search ................ 712/216, 712/218, 219
    See application file for complete search history.

(56) References Cited

U.S. PATENT DOCUMENTS

| | | | | |
|---|---|---|---|---|
| 5,625,835 | A * | 4/1997 | Ebcioglu et al. | 712/23 |
| 5,751,983 | A * | 5/1998 | Abramson et al. | 712/216 |
| 6,182,210 | B1 * | 1/2001 | Akkary et al. | 712/235 |
| 6,463,522 | B1 * | 10/2002 | Akkary | 712/216 |
| 6,493,820 | B2 * | 12/2002 | Akkary et al. | 712/235 |
| 6,505,293 | B1 * | 1/2003 | Jourdan et al. | 712/217 |
| 6,625,723 | B1 * | 9/2003 | Jourday et al. | 712/217 |
| 6,772,324 | B2 * | 8/2004 | Akkary et al. | 712/235 |
| 6,895,527 | B1 * | 5/2005 | Quach et al. | 714/5 |
| 7,222,227 | B2 * | 5/2007 | Katayama et al. | 712/239 |
| 2001/0014941 | A1 * | 8/2001 | Akkary et al. | 712/228 |
| 2002/0194457 | A1 * | 12/2002 | Akkary | 712/218 |
| 2003/0033511 | A1 * | 2/2003 | Akkary et al. | 712/235 |
| 2004/0078559 | A1 * | 4/2004 | Katayama et al. | 712/239 |
| 2004/0123081 | A1 * | 6/2004 | Knies et al. | 712/225 |

OTHER PUBLICATIONS

Tyson, Gary S. and Austin, Todd M. "Improving the Accuracy and Performance of Memory Communication Through Renaming". IEEE, ©1997. pp. 218-227.*
Gonzalez, Jose and Gonzalez, Antonio. "Speculative Execution via Address Prediction and Data Prefetching". ACM, ©1997. pp. 196-203.*

* cited by examiner

Primary Examiner—Aimee J Li
(74) Attorney, Agent, or Firm—Nixon & Vanderhye P.C.

(57) ABSTRACT

A data processing system 2 utilizes a register renaming mechanism 10, 26 to rename architectural register specifiers to physical register specifiers to facilitate out-of-order processing. The register renaming mechanism 10, 26 includes a renaming recovery unit 26 which enables recovery from incorrectly executed speculative instructions by restoring the register mapping to the state prior to those incorrect instructions with the physical registers restored to containing the data values which were current at the time prior to that incorrect instruction. In the case of load instructions, these are treated as speculative but the data value returned in response to the load instruction and stored within a physical register is released for use as soon as it is returned and prior to a determination result being available as to whether or not that data value is corrupt. Corruption checking an take the form of ECC checking, parity checking and the like, and when a late error signal is generated then this indicates whether or not the data value has been properly released for use. If corruption is detected, then the renaming recovery unit 26 is used to recover the state of the system 2 in a precise way to that preceding the failing load instruction.

19 Claims, 3 Drawing Sheets

SPECULATIVE DATA VALUE USAGE

BACKGROUND OF THE INVENTION

1. Field of the Invention

This invention relates to the field of data processing systems. More particularly, this invention relates to data processing systems using register renaming to map between architectural registers and physical registers.

2. Description of the Prior Art

It is known to provide data processing systems which utilize register renaming to map architectural register specifiers within instructions of a program stream into physical register specifiers for execution using a set of physical registers. Such register renaming is useful in facilitating techniques such as out-of-order processing when seeking high performance operation. Within systems employing register renaming in this way, it is also known that at least some of the program instructions to be executed will be speculative in the sense that, at the time when register renaming is performed, whether or not those instructions will be properly executed depends upon some unresolved condition. As an example, a conditional branch instruction may be encountered and a branch prediction made with program instructions from the predicted branch target then being speculatively executed. If it turns out that the branch was mispredicted, then those speculatively executed post-branch instructions should not have been executed and it is necessary to recover the processor state to that preceding the branch instruction such that the appropriate proper program instruction sequence can be followed. In order to achieve this when register remapping mechanisms are used, it is known to store recovery data to enable the previous state to be retrieved.

An independent technique known within data processing systems, particularly those requiring high reliability, is the use of an error correcting code (ECC) mechanism in respect of data values returned from memory. Physical or soft errors can arise resulting in corruption of data values and these can be detected, and possibly corrected, by techniques such as ECC or parity checking. If such errors are detected, then incorrect processing based upon the corrupted data value can be prevented.

SUMMARY OF THE INVENTION

Viewed from one aspect the present invention provides apparatus for processing data, said apparatus comprising:

a physical set of registers;

a register renaming circuit for mapping from register specifiers of an architectural set of register specifiers to registers of said physical set of registers to generate physical register specifiers, said architectural set of register specifiers representing registers as specified by instructions within an instruction set and said physical set of registers being physical registers for use in executing instructions of said instruction set;

at least one execution circuit responsive to instructions and associated physical register specifiers to execute said instructions using said physical set of registers, at least some of said instructions being speculatively executed based upon respective predicted outcomes of at least one unresolved instruction, said instructions being speculatively executed including load instructions respectively for loading a data value from a memory to a physical register;

a register renaming recovery circuit responsive to detection of a mispredicted speculatively executed instruction as having a mispredicted outcome to return to a mapping from said set of architectural registers to said set of physical registers that reverses changes made in said mapping that are dependent upon said mispredicted speculatively executed instruction such that said physical registers to which said set of architectural registers are mapped correspond to and contain values of said physical registers to which said architectural registers were mapped prior to execution of said mispredicted speculative executed instruction; and an error detecting circuit responsive to load instructions to generate an error signal indicative whether or not an error is detected for said load instructions; wherein a data value loaded from said memory and stored within a physical register in response to a load instruction is made available for use for further processing before said error detecting circuit has been able to generate said error signal;

said load instruction is handled by said register renaming recovery circuit as a speculative instruction until at least said error detecting circuit has been able to generate said error signal; and if said error signal indicates an error, then said register renaming recovery circuit reverses any changes in said mapping made that are dependent upon said load instruction such that said physical registers to which said set of architectural registers are mapped correspond to and contain values of said physical registers to which said architectural registers were mapped prior to execution of said load instruction.

The present technique recognises that in a system employing register renaming and speculatively executed instructions there is normally already provided a register renaming recovery mechanism that is able to restore the state of the system to that preceding an incorrectly predicted speculative instruction. Additional use of this mechanism can be made to significant advantage with little added hardware cost by using the recovery mechanism to enable recovery from an error associated with a load instruction after the data value associated with that load instruction has already been made available for use. Thus, timing restrictions in being able to identify any error (e.g. by ECC, parity checking, access permission failure etc) are eased permitting higher performance operation whilst still allowing precise hardware-based recovery from an error associated with a load instruction. Thus, the need to delay use of a data value returned from memory until, for example, an ECC checking for that data value has been completed, is removed. The present technique also avoids any need to rely upon imprecise or software supported error recovery which would be disadvantageously slow in the case of late detection of an error associated with a load instruction.

It will be appreciated that the error detection circuit can take a variety of different forms, such as, for example, an ECC-based error detection circuit, a parity-based error detection circuit, a memory management unit returning an access permission violation result or a memory protection unit returning an access permission violation result.

The error signal received after the data value has been released for use may not be the only error signal associated with that data value. As an example, access permissions, such as from a memory management unit or a memory protection unit, may be determined early and available at the same time as the data value itself, whereas a signal indicative of corruption of the data value may only be available later. The recovery mechanism can be used to recover from an access permission violation as well as a data corruption error without having to wait until the presence or absence of data corruption is known. Alternatively, the access permission result could be combined with the data corruption result to form of a combined error indicating signal which is available later after the data value was released for use but nevertheless provides for recovery from either type of error using the recovery mechanism provided.

The unresolved predicted outcome upon which the load instruction depends could take a variety of different forms. The unresolved outcome could relate to previous instructions or could relate to the instruction itself. As an example, the load instruction could follow a predicted branch which may or may not be predicted correctly. Alternatively, the unresolved outcome could be whether or not the load instruction will be subject to a permission or data corruption abort. Examples of unresolved predicted outcome results include a memory access permission violation, an alignment error, a precise external abort (e.g. an external access to a device returning an indication that the access was not permitted or completed) or the data value itself having an error therein.

The register renaming recovery logic can store memory mapping recovery data indicative of the changes in register mappings needed to reverse changes in the register mappings made in dependence upon speculatively executed instructions. In this context, the register mapping data can be stored in a first-in-first-out memory which also permits the ordered sequence of changes to be taken from such an ordered memory structure.

It will be appreciated that the above technique can permit the availability for use of a data value returned from a memory to be decoupled from a determination of whether or not the data value is in error.

Viewed from another aspect the present invention provides a method of processing data, said method comprising the steps of:

mapping from register specifiers of an architectural set of register specifiers to registers of a physical set of registers to generate physical register specifiers, said architectural set of register specifiers representing registers as specified by instructions within an instruction set and said physical set of registers being physical registers for use in executing instructions of said instruction set;

executing said instructions using said physical set of registers, at least some of said instructions being speculatively executed based upon respective predicted outcomes of at least one unresolved instruction, said instructions being speculatively executed including load instructions respectively for loading a data value from a memory to a physical register;

in response to detection of a mispredicted speculatively executed instruction as having a mispredicted outcome, returning to a mapping from said set of architectural registers to said set of physical registers that reverses changes made in said mapping that are dependent upon said mispredicted speculatively executed instruction such that said physical registers to which said set of architectural registers are mapped correspond to and contain values of said physical registers to which said architectural registers were mapped prior to execution of said mispredicted speculative executed instruction; and generating an error signal indicative whether or not an error is detected for said load instructions; wherein a data value loaded from said memory and stored within a physical register in response to a load instruction is made available for use for further processing before said generating of said error signal;

said load instruction is handled as a speculative instruction until at least said error signal has been generated; and if said error signal indicates an error, then reversing any changes in said mapping made that are dependent upon said load instruction such that said physical registers to which said set of architectural registers are mapped correspond to and contain values of said physical registers to which said architectural registers were mapped prior to execution of said load instruction.

Viewed from a further aspect the present invention provides apparatus for processing data, said apparatus comprising:

a physical set of registers;

register renaming means for mapping from register specifiers of an architectural set of register specifiers to registers of said physical set of registers to generate physical register specifiers, said architectural set of register specifiers representing registers as specified by instructions within an instruction set and said physical set of registers being physical registers for use in executing instructions of said instruction set;

at least one execution means responsive to instructions and associated physical register specifiers for executing said instructions using said physical set of registers, at least some of said instructions being speculatively executed based upon respective predicted outcomes of at least one unresolved instruction, said instructions being speculatively executed including load instructions respectively for loading a data value from a memory to a physical register;

register renaming recovery means responsive to detection of a mispredicted speculatively executed instruction as having a mispredicted outcome for returning to a mapping from said set of architectural registers to said set of physical registers that reverses changes made in said mapping that are dependent upon said mispredicted speculatively executed instruction such that said physical registers to which said set of architectural registers are mapped correspond to and contain values of said physical registers to which said architectural registers were mapped prior to execution of said mispredicted speculative executed instruction; and error detecting means responsive to load instructions for generating an error signal indicative whether or not an error is detected for said load instructions; wherein a data value loaded from said memory and stored within a physical register in response to a load instruction is made available for use for further processing before said error detecting means has been able to generate said error signal;

said load instruction is handled by said register renaming recovery means as a speculative instruction until at least said error detecting means has been able to generate said error signal; and if said error signal indicates an error, then said register renaming recovery means reverses any changes in said mapping made that are dependent upon said load instruction such that said physical registers to which said set of architectural registers are mapped correspond to and contain values of said physical registers to which said architectural registers were mapped prior to execution of said load instruction.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
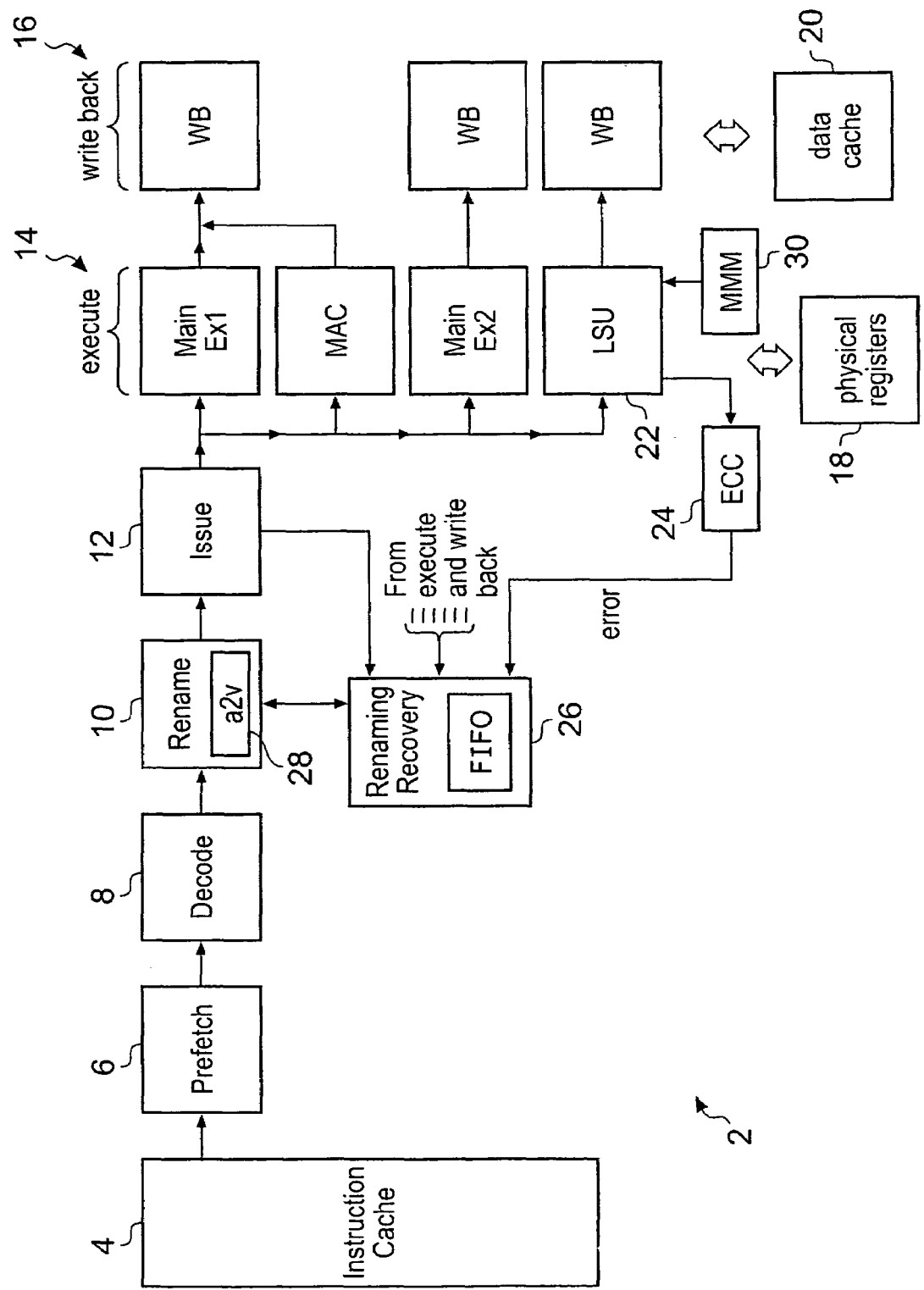
FIG. 1 schematically illustrates a data processing apparatus employing register renaming.

FIG. 1 schematically illustrates a data processing apparatus 2. It will be appreciated that such a data processing apparatus 2 will typically include many further elements as will be familiar to those in this technique field, but these elements have been omitted from FIG. 1 for the sake of clarity. The data processing apparatus 2 includes an instruction pipeline in which instructions are passed from an instruction cache 4 into the instruction pipeline comprising a prefetch stage 6, a decode stage 8, a renaming stage 10, an issue stage 12, an execute stage 14 and a writeback stage 16. Physical registers 18 are provided for storing data values to be manipulated by the elements of the execute stage 14 and the writeback stage 16. A data cache 20 is provided for storing data values which can be loaded into the physical registers 18 in response to load instructions. Such load instructions are performed by a load/store unit 22 within the execution stage 14 in response to load instructions issued thereto by the issue stage 12. It will be appreciated that the execute stage 14 includes multiple elements allowing parallel issue of different instructions. The renaming stage 10, which serves to map architectural register specifiers to physical register specifiers, facilitates the out-of-order issue of program instructions by the issue stage 12.

A renaming recovery unit 26 coupled to the renaming stage 10, the issue stage 12, an ECC detector 24 and various other elements from the execute stage 14 and the writeback stage 16. The renaming recovery unit 26 stores register mapping recovery data indicative of changes in register mappings needed to recover from incorrect execution of speculatively executed instructions which have been subject to register renaming by the renaming stage 10. When a signal is detected indicating a speculative instruction is not properly executed, such as failure of a condition code, misprediction of a branch, an access permission abort etc, then this is signalled back to the renaming recovery circuit 26 which then employs the data stored in respect of the speculative instruction concerned and dependent subsequent instructions that have been subject to remapping to reverse the remapping changes made such that the mapping adopted (and data stored) corresponds to that preceding the incorrectly executed speculative instruction. Physical registers 18 which are storing data values which may be needed for such recovery actions are preserved within the set of physical registers 18 and are not overwritten by being reused in mappings when they no longer represent the current mapping as given in an architectural to virtual mapping table 28 until after recovery using those previous data values and physical registers is no longer a potential possibility.

It will be seen that associated with the load/store unit 22 is a memory management unit 30 and an ECC detector 24. The memory management unit 20 stores access permission data which is used to determine whether or not a load instruction to a particular memory location is or is not permitted depending upon the characteristics associated with that memory location, such as privileged-only modes of access etc. Such an access permission result may be relatively rapidly obtained and is available in this example embodiment at the same time as the data value is returned from the data cache 20 to be loaded into the appropriate one of the physical registers 18. When the data value is returned, if it has passed its access permission test, then it is written into the physical register 18 concerned and is then available for use by subsequent program instructions. This avoids any delay being introduced as a result of further checking that is performed upon the data value itself by the ECC detector 24.

The ECC detector 24 receives the data value returned to the load/store unit 22 and performs error correcting code checking thereon. This takes a finite amount of time to complete and the result of this error checking is not available until some time after the data value has been written to the physical register 18 and has potentially be subject to use by subsequent program instructions. If the ECC detector 24 determines that the data value is corrupted, then it generates an error signal which is passed to the renaming recovery unit 26 to trigger a recovery operation. This recovery operation returns the register mapping to that used prior to the load instruction which has resulted in the failure with the physical registers being pointed to containing the data values which were current at that prior time.

It will be realised that the error detection performed upon the data value could take a variety of forms, including ECC checking and parity checking although other forms of error detection are possible.

It will also be understood from the above that the access permission signal is returned early whereas the data value error signal is returned late. Alternative embodiments could combine these two signals into a single late returned error signal indicative of any form of error associated with the load instruction.

Figure 2:
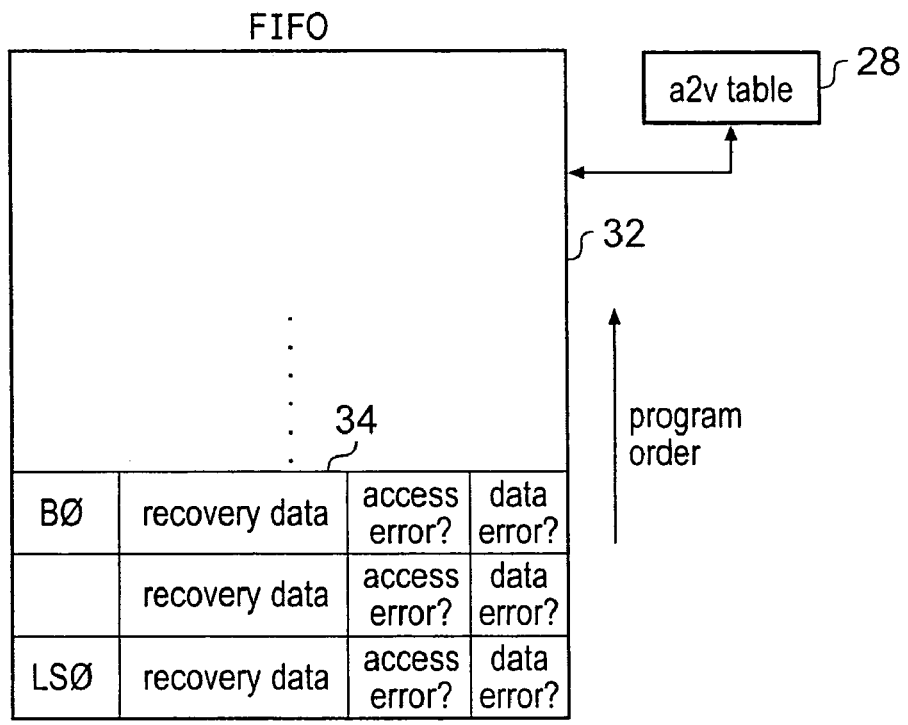
FIG. 2 schematically illustrates a first-in-first-out memory used for storing register mapping recovery data.

FIG. 2 schematically illustrates a first-in-first-out memory 32 which forms part of the renaming recovery unit 26. This FIFO memory 32 stores an ordered list of entries representing speculative instructions that have been issued by the issue stage 10 and associated therewith register mapping recovery data 34 which may be used to reverse the changes in register mappings made in association with those speculatively executed instructions. Also associated with those speculatively executed instructions are, at least where appropriate, flags indicating whether or not the speculatively executed instruction may be subject to a memory permission access error and/or a data value corruption error. These flags can be cleared as appropriate by access permission result signals and data corruption error result signals generated in dependence upon the MMU 30 and the ECC detector 24 respectively. In the case of a load instruction, when both of these flags are cleared, then this indicates that the instruction concerned is no longer speculative and if the load instruction is the latest instruction within the FIFO memory 32, then it can be removed from that FIFO memory. It will be appreciated that further flags may be associated with instructions, such as indicating whether or not a particular instruction has an associated condition code, which may or may not be met depending upon the outcome of preceding instructions.

Figure 3:
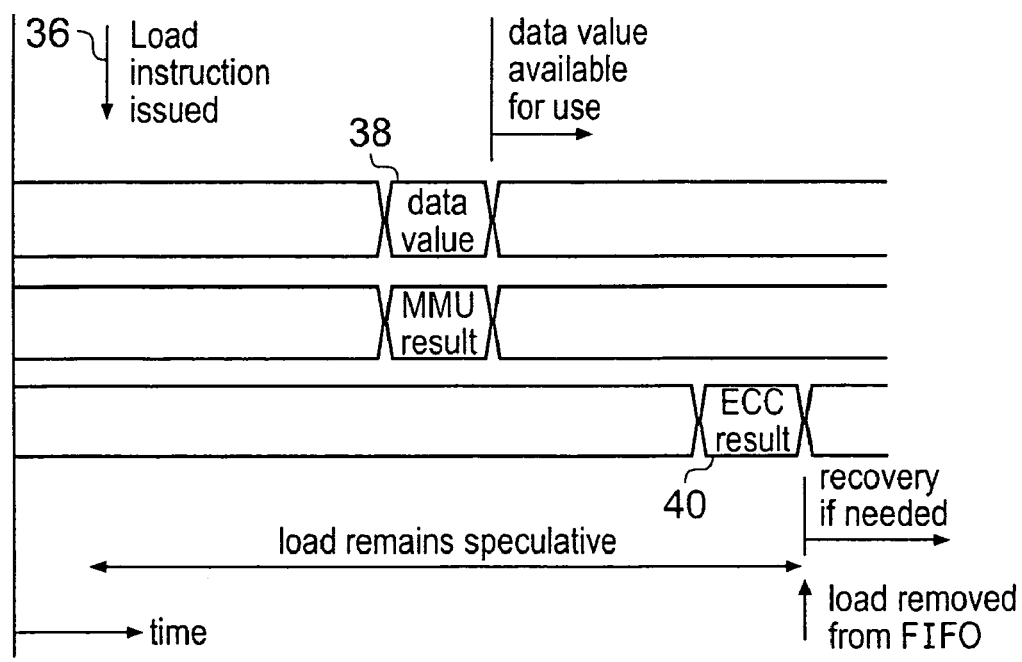
FIG. 3 is a timing diagram illustrating the relative timing of various events in accordance with an example of the present technique.

FIG. 3 is a timing diagram illustrating the relative timing of different events associated with a load instruction in the example embodiment of FIG. 1. The first event is the issue of the load instruction at time 36 by the issue stage 10. The load instruction is issued to the load/store unit 22 which uses one of its load/store slots to recover a data value from the data cache 20 (and possibly some higher order memory upon a cache miss). This data value is returned at time 38. The access permission data stored within the MMU 30 (which could in alternative embodiments be a memory protection unit) indicates at the same time whether or not an access permission violation has occurred. If an access permission violation has not occurred, then the data value is made available for use by subsequent program instructions from the time following time 38. The data value returned at time 38 is also passed to the ECC 24 where it is subject to error correction processing.

The error correction result is made available at time 40, which is some time after the corresponding data value for the load was returned and released to be available for use. Thus, the occurrence of an error as detected by the ECC detector 24 is decoupled from the use of the data value concerned which takes place from time 38. The load instruction remains speculative from time 36 until the final determination of whether or not the data value is corrupt at time 40. If the data value is corrupt, then the needed recovery operation is performed utilising the register remapping recovery data stored within the FIFO memory 32. In any case, the load is removed from the FIFO memory 32 following time 40 as it is no longer speculative, i.e. it has been resolved as either properly executed or not properly executed.

Figure 4:
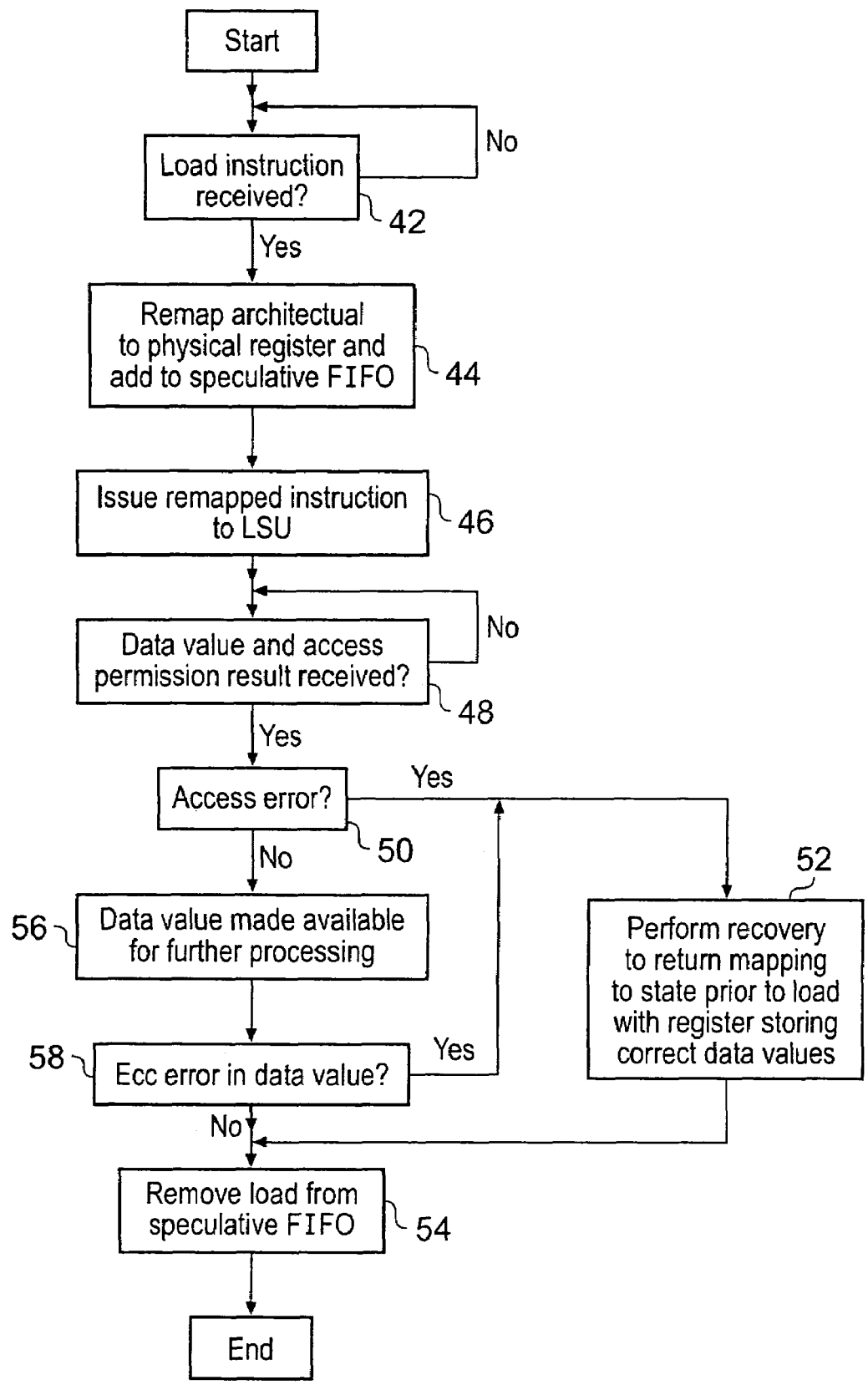
FIG. 4 is a flow diagram schematically illustrating one view of the processing of a load instruction in accordance with one example of the present technique.

FIG. 4 is a flow diagram schematically illustrating the processing of a load instruction. At step 42 the system waits for a load instruction to be received. At step 44 a remapping of architectural to physical register specifiers is performed for a received load instruction and associated remapping recovery data is stored into the speculative instruction FIFO memory 32. At step 46 the remapped load instruction is issued to the load store unit 22. Step 48 waits for the data value and access permission result to be returned. At step 50, a determination as to whether or not the access permission result indicated an access permission violation. If such an access permission violation has occurred, then processing proceeds to step 52 at which a recovery operation is performed to return the register mapping to a state prior to the load instruction with the registers concerned storing the correct data values as were present within the physical registers at that time prior to the load instruction. Processing then proceeds to step 54 at which the load instruction is removed from the FIFO memory 32. If the determination at step 50 was that a access permission violation has not occurred, then processing proceeds to step 56 at which the data value is made available for further processing without waiting for the signal indicative of whether or not the data value is corrupt. The determination of whether the data value is corrupt is made at step 58. If an error in the data value is detected, then processing proceeds to step 52 where recovery is performed. If an error in the data value is not detected, then processing proceeds to step 54.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a physical set of registers;
   a register renaming circuit for mapping from register specifiers of an architectural set of register specifiers to registers of said physical set of registers to generate physical register specifiers, said architectural set of register specifiers representing registers as specified by instructions within an instruction set and said physical set of registers being physical registers for use in executing instructions of said instruction set;
   at least one execution circuit, responsive to said instructions and associated physical register specifiers, configured to speculatively execute at least some of said instructions using said physical set of registers based upon respective predicted outcomes of at least one unresolved instruction, said instructions being speculatively executed including load instructions respectively for loading a data value from a memory to a physical register;
   a register renaming recovery circuit, responsive to detection of a mispredicted speculatively executed instruction as having a mispredicted outcome, configured to return to a mapping from said set of architectural registers to said set of physical registers that reverses changes made in said mapping that are dependent upon said mispredicted speculatively executed instruction such that said physical registers to which said set of architectural registers are mapped correspond to and contain values of said physical registers to which said architectural registers were mapped prior to execution of said mispredicted speculative executed instruction; and
   an error detecting circuit responsive to load instructions to generate an error signal indicative whether or not an error is detected for said load instructions; wherein
   a data value loaded from said memory and stored within a physical register in response to a load instruction is made available for use for further processing before said error detecting circuit has been able to generate said error signal;
   said load instruction is handled by said register renaming recovery circuit as a speculative instruction until at least said error detecting circuit has been able to generate said error signal; and
   if said error signal indicates an error, then said register renaming recovery circuit reverses any changes in said mapping made that are dependent upon said load instruction such that said physical registers to which said set of architectural registers are mapped correspond to and contain values of said physical registers to which said architectural registers were mapped prior to execution of said load instruction.

2. Apparatus as claimed in claim 1, wherein said error detection circuit is one or more of:
   an ECC-based error detection circuit;
   a parity-based error detection circuit;
   a memory management unit returning an access permission violation result after said data value has been returned; and
   a memory protection unit returning an access permission violation result after said data value has been returned.

3. Apparatus as claimed in claim 1, further comprising a memory management unit responsive to load instructions to determine if said load instructions violate any access permissions and wherein said load instruction is handled by said register renaming recovery circuit as a speculative instruction until at least after a time at which said memory management unit would indicate any violation of an access permission by said load instruction.

4. Apparatus as claimed in claim 3, wherein said memory management unit indicates any violation of an access permission no later than when said data value is returned from said memory.

5. Apparatus as claimed in claim 1, further comprising a memory protection unit responsive to load instructions to determine if said load instructions violate any access permissions and wherein said load instruction is handled by said register renaming recovery circuit as a speculative instruction until at least after a time at which said memory protection unit would indicate any violation of an access permission by said load instruction.

6. Apparatus as claimed in claim 5, wherein said memory protection unit indicates any violation of an access permission no later than when said data value is returned from said memory.

7. Apparatus as claimed in claim 1, wherein said at least one predicted outcome of an unresolved instruction upon which speculative execution of said load instruction is based includes whether or not said load instruction itself will result in one or more of:
   a memory access permission violation;
   an alignment error;
   a precise external abort; and
   said data value returned from said memory having an error therein.

8. Apparatus as claimed in claim 1, wherein said register renaming recovery circuit stores register mapping recovery data indicative of changes in said register mapping needed to reverse changes in said register mapping made in dependence upon speculatively executed instructions.

9. Apparatus as claimed in claim 8, wherein said register mapping data is stored in a first-in-first-out memory within said register renaming recovery circuit such that an ordered sequence of changes needed in response to a mispredicted outcome can be read from said first-in-first-out memory.

10. Apparatus as claimed in claim 1, wherein availability for use of said data value returned from said memory is decoupled from a determination of whether or not said data value is in error.

11. A method of processing data, said method comprising the steps of:
   mapping from register specifiers of an architectural set of register specifiers to registers of a physical set of registers to generate physical register specifiers, said architectural set of register specifiers representing registers as specified by instructions within an instruction set and said physical set of registers being physical registers for use in executing instructions of said instruction set;
   executing said instructions using said physical set of registers, at least some of said instructions being speculatively executed based upon respective predicted outcomes of at least one unresolved instruction, said instructions being speculatively executed including load instructions respectively for loading a data value from a memory to a physical register;
   in response to detection of a mispredicted speculatively executed instruction as having a mispredicted outcome, returning to a mapping from said set of architectural registers to said set of physical registers that reverses changes made in said mapping that are dependent upon said mispredicted speculatively executed instruction such that said physical registers to which said set of architectural registers are mapped correspond to and contain values of said physical registers to which said architectural registers were mapped prior to execution of said mispredicted speculative executed instruction; and
   generating an error signal indicative whether or not an error is detected for said load instructions; wherein
   a data value loaded from said memory and stored within a physical register in response to a load instruction is made available for use for further processing before said generating of said error signal;
   said load instruction is handled as a speculative instruction until at least said error signal has been generated; and
   if said error signal indicates an error, then reversing any changes in said mapping made that are dependent upon said load instruction such that said physical registers to which said set of architectural registers are mapped correspond to and contain values of said physical registers to which said architectural registers were mapped prior to execution of said load instruction.

12. A method as claimed in claim 11, wherein said error signal is one or more of:
   an ECC-based error signal;
   a parity-based error signal; and
   an access permission violation signal.

13. A method as claimed in claim 11, further comprising in response to load instructions determining if said load instructions violate any access permissions and wherein said load instruction is handled as a speculative instruction until at least after a time at which any violation of an access permission by said load instruction would be indicated.

14. A method as claimed in claim 13, wherein any violation of an access permission is indicated no later than when said data value is returned from said memory.

15. A method as claimed in claim 11, wherein said at least one predicted outcome of an unresolved instruction upon which speculative execution of said load instruction is based includes whether or not said load instruction itself will result in one or more of:
   a memory access permission violation;
   an alignment error;
   a precise external abort; and
   said data value returned from said memory having an error therein.

16. A method as claimed in claim 11, comprising storing register mapping recovery data indicative of changes in said register mapping needed to reverse changes in said register mapping made in dependence upon speculatively executed instructions.

17. A method as claimed in claim 16, wherein said register mapping data is stored in a first-in-first-out memory such that an ordered sequence of changes needed in response to a mispredicted outcome can be read from said first-in-first-out memory.

18. A method as claimed in claim 11, wherein availability for use of said data value returned from said memory is decoupled from a determination of whether or not said data value is in error.

19. Apparatus for processing data, said apparatus comprising:
   a physical set of registers;
   register renaming means for mapping from register specifiers of an architectural set of register specifiers to registers of said physical set of registers to generate physical register specifiers, said architectural set of register specifiers representing registers as specified by instructions within an instruction set and said physical set of registers being physical registers for use in executing instructions of said instruction set;
   at least one execution means, responsive to said instructions and associated physical register specifiers, for speculatively executing at least some of said instructions using said physical set of registers based upon respective predicted outcomes of at least one unresolved instruction, said instructions being speculatively executed including load instructions respectively for loading a data value from a memory to a physical register;
   register renaming recovery means, responsive to detection of a mispredicted speculatively executed instruction as having a mispredicted outcome, for returning to a mapping from said set of architectural registers to said set of physical registers that reverses changes made in said mapping that are dependent upon said mispredicted speculatively executed instruction such that said physical registers to which said set of architectural registers are mapped correspond to and contain values of said physical registers to which said architectural registers were mapped prior to execution of said mispredicted speculative executed instruction; and error detecting means, responsive to load instructions, for generating an error signal indicative whether or not an error is detected for said load instructions; wherein a data value loaded from said memory and stored within a physical register in response to a load instruction is made available for use for further processing before said error detecting means has been able to generate said error signal;

said load instruction is handled by said register renaming recovery means as a speculative instruction until at least said error detecting means has been able to generate said error signal; and if said error signal indicates an error, then said register renaming recovery means reverses any changes in said mapping made that are dependent upon said load instruction such that said physical registers to which said set of architectural registers are mapped correspond to and contain values of said physical registers to which said architectural registers were mapped prior to execution of said load instruction.

* * * * *